(12) United States Patent
Verplanken

(10) Patent No.: US 11,237,985 B2
(45) Date of Patent: Feb. 1, 2022

(54) CONTROLLING ALLOCATION OF ENTRIES IN A PARTITIONED CACHE

(71) Applicant: Arm Limited, Cambridge (GB)

(72) Inventor: Fabrice Jean Verplanken, Sheffield (GB)

(73) Assignee: Arm Limited, Cambridge (GB)

( * ) Notice: Subject to any disclaimer, the term of this patent is extended or adjusted under 35 U.S.C. 154(b) by 97 days.

(21) Appl. No.: 16/666,878

(22) Filed: Oct. 29, 2019

(65) Prior Publication Data

US 2021/0124694 A1    Apr. 29, 2021

(51) Int. Cl.
*G06F 12/00* (2006.01)
*G06F 12/126* (2016.01)
*G06F 12/0846* (2016.01)

(52) U.S. Cl.
CPC ........ *G06F 12/126* (2013.01); *G06F 12/0848* (2013.01); *G06F 2212/604* (2013.01)

(58) Field of Classification Search
CPC ............... G06F 12/126; G06F 12/0848; G06F 2212/604
See application file for complete search history.

(56) References Cited

U.S. PATENT DOCUMENTS

| 6,571,301 | B1 * | 5/2003 | Nakahara | G06F 5/14 710/31 |
| 8,099,556 | B2 * | 1/2012 | Ghosh | G06F 12/0802 711/122 |
| 10,394,454 | B2 | 8/2019 | Krueger | |
| 2004/0059879 | A1 * | 3/2004 | Rogers | G06F 12/0811 711/154 |
| 2008/0250415 | A1 * | 10/2008 | Illikkal | G06F 9/5077 718/103 |
| 2014/0215181 | A1 * | 7/2014 | Svendsen | G06F 12/1018 711/216 |

(Continued)

OTHER PUBLICATIONS

Intel, "Improving Real-Time Performance by Utilizing Cache Allocation Technology", White Paper, Apr. 2015, 16 pages.

(Continued)

*Primary Examiner* — David Yi
*Assistant Examiner* — Tahilba O Puche
(74) *Attorney, Agent, or Firm* — Nixon & Vanderhye P.C.

(57) ABSTRACT

An apparatus and method are described, the apparatus comprising: a cache comprising a plurality of entries, each associated with a partition identifier; storage circuitry to store counters, each indicative of a number of entries in the cache associated with respective partition identifiers; and cache control circuitry responsive to a request identifying a given partition identifier to control allocation of an entry dependent on the counter associated with the given partition identifier. The cache control circuitry increments the counter associated with the given partition identifier in response to an entry associated with the given partition identifier being allocated, and decrements the counter associated with the given partition identifier in response to an entry associated with the given partition identifier being evicted or replaced. When a request to increment the counters is pending, the cache control circuitry prioritises the pending increment request in preference over a request to decrement the counters.

17 Claims, 9 Drawing Sheets

(56) References Cited

U.S. PATENT DOCUMENTS

2018/0203807 A1* 7/2018 Krueger .............. G06F 12/1045
2019/0056870 A1* 2/2019 Sun ....................... G06F 3/0611

OTHER PUBLICATIONS

[Online], "Introduction to Cache Allocation Technology in the Intel Xeon Processor E5 v4 Family", Intel, submitted by Khang N. on Feb. 11, 2016, 4 pages.
[Online], "Benefits of Intel Cache Monitoring Technology in the Intel Xeon Processor E5 v3 Family", Intel, submitted by Khang N. on Sep. 8, 2014, 2 pages.
[Online], "Introduction to Memory Bandwidth Monitoring in the Intel Xeon Processor E5 v4 Family", Intel, submitted by Khang N. on Feb. 11, 2016, 3 pages.

* cited by examiner

14
CONTROLLING ALLOCATION OF ENTRIES IN A PARTITIONED CACHE

BACKGROUND

Technical Field

The present technique relates to the field of data processing.

Technical Background

Two or more software execution environments, such as applications or virtual machines, may be executed on the same data processing system with access to a common memory system shared between software execution environments. For some systems it may be important that the performance of one software execution environment is not held back due to other software execution environments using too much resource in the shared memory system. This problem can be referred to as the "noisy neighbour" problem and can be particularly significant for enterprise networking or server systems for example.

An example of a resource that may be shared between multiple execution environments is a cache. In some systems, it may be important that the number of cache entries available to a given execution environment is not severely limited due to another execution environment being allocated too many entries, since this may negatively impact the performance of the given execution environment.

SUMMARY

Viewed from one example, the present technique provides an apparatus comprising:

a cache comprising a plurality of entries, each entry being associated with a partition identifier;

storage circuitry configured to store at least one counter, each indicative of a number of entries in the cache associated with a respective partition identifier; and cache control circuitry configured to allocate entries to the cache in response to requests, in which the cache control circuitry is responsive to a request identifying a given partition identifier to control allocation of an entry in dependence on the counter associated with the given partition identifier;

in which the cache control circuitry is configured to increment the counter associated with the given partition identifier in response to an entry in the cache associated with the given partition identifier being allocated, and to decrement the counter associated with the given partition identifier in response to an entry in the cache associated with the given partition identifier being evicted or replaced; and in which when an increment request to increment the at least one counter is pending, the cache control circuitry is configured to prioritise the pending increment request in preference over a decrement request to decrement the at least one counter.

Viewed from another example, the present technique provides a method comprising:

storing a plurality of entries in a cache, each entry being associated with a partition identifier;

storing at least one counter in storage circuitry, each counter indicative of a number of entries in the cache associated with a respective partition identifier;

responsive to a request identifying a given partition identifier, controlling allocation of an entry to the cache in dependence on the counter associated with the given partition identifier;

incrementing the counter associated with the given partition identifier in response to an entry in the cache associated with the given partition identifier being allocated, and decrementing the counter associated with the given partition identifier in response to an entry in the cache associated with the given partition identifier being evicted or replaced; and when an increment request to increment the at least one counter is pending, prioritising the pending increment request in preference over a decrement request to decrement the at least one counter.

Viewed from another aspect, the present technique provides an apparatus comprising:

means for storing a plurality of entries, each entry being associated with a partition identifier;

means for storing at least one counter, each indicative of a number of entries in the cache associated with a respective partition identifier;

means for controlling, responsive to a request identifying a given partition identifier, allocation of an entry to the means for storing a plurality of entries, in dependence on the counter associated with the given partition identifier;

means for incrementing the counter associated with the given partition identifier in response to an entry associated with the given partition identifier being allocated to the means for storing a plurality of entries, and means for decrementing the counter associated with the given partition identifier in response to an entry associated with the given partition identifier being evicted or replaced in the means for storing a plurality of entries; and in which when an increment request to increment the at least one counter is pending, the means for incrementing and the means for decrementing are configured to prioritise the pending increment request in preference over a decrement request to decrement the at least one counter.

Further aspects, features and advantages of the present technique will be apparent from the following description of examples, which is to be read in conjunction with the accompanying drawings.

DESCRIPTION OF EXAMPLES

Figure 1:
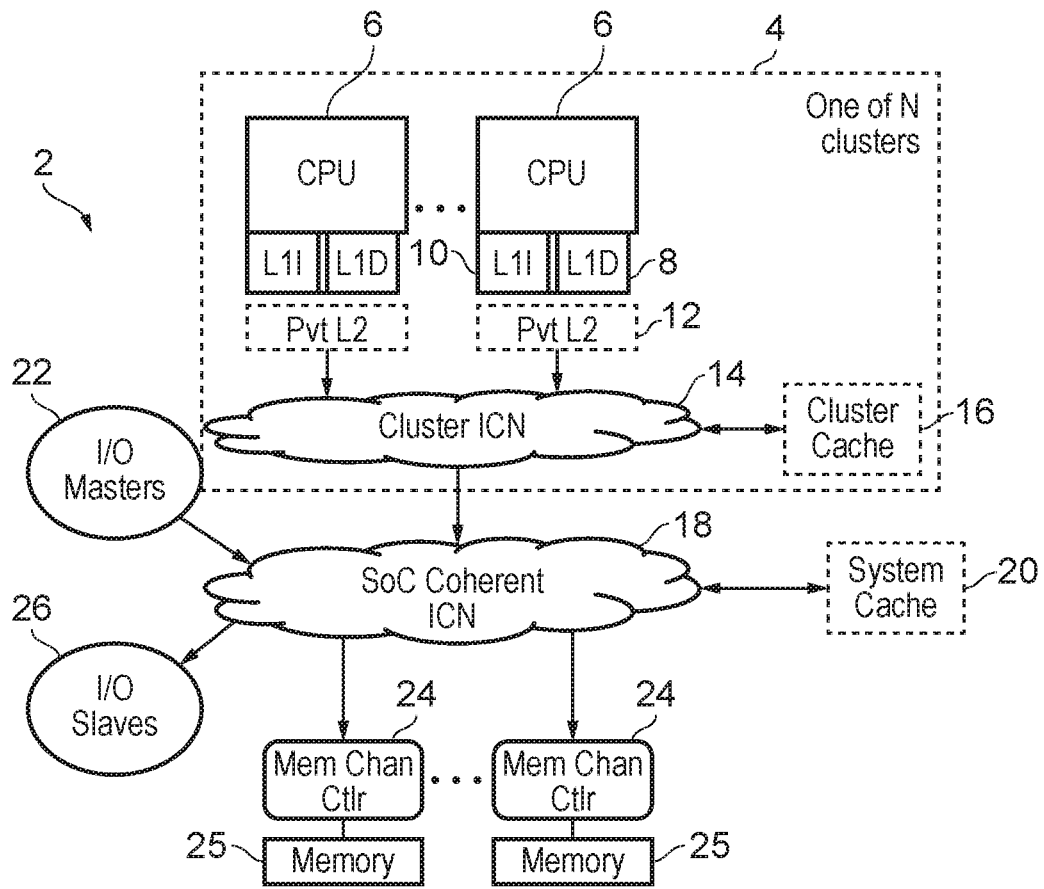
FIG. 1 schematically illustrates an example of a data processing system comprising a memory system.

A plurality of software execution environments executing on the same data processing system may each be assigned a partition identifier, and memory resources such as a cache may be partitioned such that allocation of those resources is dependent on the partition identifier.

In accordance with one example configuration there is provided a cache comprising a plurality of entries, each entry being associated with a partition identifier. Storage circuitry is also provided, configured to store at least one counter, each indicative of a number of entries in the cache associated with a respective partition identifier. Cache control circuitry is provided, configured to allocate entries to the cache in response to requests, in which the cache control circuitry is responsive to a request identifying a given partition identifier to control allocation of an entry in dependence on the counter associated with the given partition identifier. The cache control circuitry is configured to increment the counter associated with the given partition identifier in response to an entry in the cache associated with the given partition identifier being allocated, and to decrement the counter associated with the given partition identifier in response to an entry in the cache associated with the given partition identifier being evicted or replaced. When an increment request to increment the at least one counter is pending, the cache control circuitry is configured to prioritise the pending increment request in preference over a decrement request to decrement the at least one counter.

The approach described above provides a number of advantages. By using counters to track the number of entries on the cache associated with particular partition identifiers, and controlling allocation to the cache based on the counters, the proportion of cache entries allocated for each partition identifier can be controlled. This allows control circuitry to prevent some partition identifiers from being allocated too many cache entries, which may reduce the cache space available to processes associated with other partition identifiers and negatively impact the performance of those processes. Therefore, the present technique allows the performance of the data processing system to be improved, by preventing processes associated with some partition identifiers from using too much space in a cache.

Prioritising requests to increment the counters over requests to decrement the counters allows the performance of the system to be further improved. There may be a limited bandwidth available for updating the counters, so if there are several requests to increment or decrement the counters, some requests may have to be delayed until there is sufficient bandwidth available. Prioritising increments to the counters over decrements means that, if some pending requests have not yet been dealt with, any inaccuracy in the tracking of cache occupancy is conservative—that is, the counters will tend to overestimate the occupancy for a given partition identifier, rather than underestimate it. Conservative inaccuracies such as these are acceptable—while underestimating the occupancy for a given partition identifier could lead to too many entries being allocated for that partition identifier (which may contravene any controls on maximum cache occupancy imposed on a given partition identifier), overestimating the occupancy can only lead to fewer entries being allocated for that partition identifier, which is just an issue for performance for that partition identifier, rather than impacting on other partition identifier's share of cache resources. Therefore, the performance impact of one partition identifier being allocated too many cache entries can still be avoided. Furthermore, it should be noted that prioritising increment requests over decrement requests may result in only a temporary conservative inaccuracy, since the decrement request may remain pending until the counter is decremented.

In accordance with the present technique, the cache may be a set-associative cache, a fully associative cache or a direct-mapped cache.

In some examples, the at least one counter may include one counter for each partition identifier. Hence, some implementations may provide sufficient counter storage circuitry in hardware that there is space to store one counter for each of the partition identifiers which could be specified in a request sent to the cache.

Alternatively, there could be some partition identifiers which are not associated with a counter provided in hardware. For example, the number of partition identifiers permitted to allocate entries to the cache at a given time may be limited, so that any access requests from additional partition identifiers may be serviced without allocating entries to the cache (e.g. by reading or writing straight to main memory) or by evicting all cached data associated with another partition identifier and reusing its counter for the new partition identifier. Alternatively, all partition identifiers may be allowed to allocate to the cache, with each partition identifier having an associated counter stored in memory. In this case, the storage circuitry of the present technique may act as a cache for the counters for a subset of the partition identifiers (e.g. a number of recently encountered partition identifiers). If the counter associated with a given partition identifier is not available in the storage circuitry when allocating an entry to the cache, the cache control circuitry may be arranged to access the counter in memory.

In some examples, the cache control circuitry is configured to postpone the decrement request until a processing cycle in which an increment request is absent or when a number of pending increment requests is less than a maximum number of counter update requests which can be handled in the same processing cycle.

Typically, a majority of accesses to a cache do not trigger allocation of new entries to the cache. Read and write requests specifying an address for which an entry has already been allocated do not require a new entry to be allocated. In practice, this tends to be the case for the majority of cache accesses, due to temporal locality in address accesses. That is, a given access is more likely to specify an address than has been accessed more recently, which leads to a high hit rate in the cache. In processing cycles where no new entries are being allocated to the cache, no increment requests are issued. Therefore, the cache control circuitry may delay executing a decrement request until such a processing cycle where no increment requests are carried out. An alternative technique to avoid allocating to the cache based on an under-estimate of cache occupancy could be to stall cache requests which require allocations while the decrement requests is carried out, but this could negatively affect the performance of the system. In contrast, by prioritising increment requests over decrement requests, performance can be improved as such stalls may not be needed as often.

It may be possible for more than one increment or decrement request to be handled during a single processing cycle. In such cases, the control circuitry may not need to wait until a processing cycle where no increment requests are being carried out, but can instead wait until there is space in a given processing cycle for a decrement request to be carried out. For example, if two decrement/increment requests can be carried out per processing cycle, the cache control circuitry may delay the decrement request until a cycle in which either no increment requests are being processed, or only one increment request is being processed.

In some examples, the apparatus may also comprise maximum occupancy storage circuitry configured to store at least one maximum occupancy value, each indicative of a maximum occupancy for a respective partition identifier. In such examples, responsive to the request identifying the given partition identifier, the cache control circuitry may be configured to compare the value of the counter associated with the given partition identifier with the maximum occupancy value associated with the given partition identifier, and to control the allocation of said entry in dependence on the comparison.

The maximum occupancy storage circuitry may be the same storage circuitry that stores the at least one counter, or it may be a different storage structure. The at least one maximum occupancy value may be indicative of a maximum number of entries in the cache that can be allocated for a given partition identifier. This allows entries to be allocated to the cache without some partition identifiers being allocated too much space in the cache. There may be one maximum occupancy value stored for each partition identifier; alternatively, there may be some partition identifiers for which no maximum occupancy value is stored (e.g. if only a subset of partition identifiers are permitted to allocate entries to the cache at a time, or if the maximum occupancy storage circuitry acts as a cache for a subset of maximum occupancy counters stored in memory, similar to the examples given for the counters above).

In some examples, when the cache control circuitry determines that the value of the counter associated with the given partition identifier is less than the maximum occupancy value associated with the given partition identifier, the cache control circuitry is configured to allocate said entry in the cache for the request. When the cache control circuitry determines that the value of the counter associated with the given identifier is greater than or equal to the maximum occupancy for the given identifier, the cache control circuitry is configured to evict an existing entry in the cache for the given partition identifier, and replace the existing entry with said entry allocated for the request.

In this way, an entry can be allocated to the cache without exceeding the maximum occupancy value for a given partition identifier. By replacing an existing entry for the given partition identifier, when the value of the counter associated with the given identifier is greater than or equal to the maximum occupancy for the given identifier, the data associated with the request can still be stored in the cache (allowing a subsequent access to the same address to be carried out more quickly), without increasing the cache occupancy for that partition identifier.

In another example, when the cache control circuitry determines that the value of the counter associated with the given identifier is greater than or equal to the maximum occupancy for the given identifier, the cache control circuitry may instead service the request without allocating an entry in the cache for the address specified by the request.

In some examples, the maximum occupancy value for each partition identifier is configurable by software.

In some examples, a decrement request buffer may be provided, configured to store pending decrement requests.

In some examples, the decrement request buffer is a first-in-first-out (FIFO) buffer, which can be relatively simple to implement in hardware.

In some examples, when a number of available entries in the decrement request buffer falls below a predetermined threshold number, the cache control circuitry is configured to stall further requests to update the cache for a predetermined period.

Stalling further requests to update the cache prevents new increment and decrement requests from being issued, which allows the cache control circuitry to execute the decrement requests in the decrement request buffer, freeing up space in the decrement request buffer.

It might appear counter-intuitive to stall cache requests merely to allow a set of tracking counters to be decremented. Stalling cache requests impacts on the processor performance, which may have to wait for its read data to be available before executing subsequent instructions, and this may slow down execution of the subsequent instructions. Therefore, it is typically expected that cache requests should be handled as fast as possible.

On the other hand, tracking counters are typically seen as being useful primarily for performance monitoring, so minor inaccuracies would not usually be seen as a significant problem. It therefore may seem counter-intuitive to delay the requests which directly impact on processor performance (cache requests), to prioritise updating a set of tracking counters.

However, since the counters of the present technique influence cache allocation (e.g. through a determination of whether the occupancy for a given partition identifier has reached a maximum value), "losing" decrement requests due to overflow of the decrement request buffer could lead to overestimating the cache occupancy for one or more partition identifiers. If decrements for a given counter (associated with a given partition identifier) are repeatedly lost from the buffer, this could result in that given partition identifier being starved of cache allocation (even if the maximum occupancy has not really been reached), impacting performance of processes associated with that partition identifier. Therefore, counter-intuitively, stalling some cache requests to make bandwidth available for catching up with pending decrement requests when the number of available buffer entries drops below a threshold can be better for overall performance.

The predetermined period may be defined in any of a number of ways. In some examples, the predetermined period is at least one of: a period until the number of available entries in the decrement request buffer reaches a predetermined number, and a predetermined number of processing cycles.

The predetermined number of available entries may be the same as the predetermined threshold number, or it may be a different number. For example, the predetermined number of available entries could be zero, so that the decrement buffer is emptied before requests to update the cache are resumed.

In some examples, the cache control circuitry is configured to merge two or more decrement requests. These may be two or more requests specifying the same partition identifier (and therefore the same counter). The merged decrement request may therefore require the counter to be incremented a number of times equal to the number of requests merged together (e.g. if two decrement requests to a given counter are merged, the merged request specifies that the counter should be decremented by two). This reduces the number of requests that need to be issued to decrement a given counter, which improves the performance of the system by allowing the counter to be updated in fewer processing cycles.

In some examples, the cache comprises a set-associative cache. When a plurality of entries in a given set of the cache are evicted or replaced in response to a single request, generating a plurality of decrement requests including at least two decrement requests for decrementing the counter relating to the same partition identifier, the cache control circuitry is configured to merge the at least two of decrement requests into a single decrement request. In such examples, the at least two decrement requests may be merged before any of them are allocated to the decrement request buffer. This approach to merging is relatively efficient to implement in hardware, as comparison logic to detect that there are multiple decrement requests relating to the same partition identifier may restrict its comparison to the decrement requests generated in response to the same request, rather than considering all the decrement requests already allocated into the decrement request buffer.

In some examples, prior to allocating a further decrement request to the decrement request buffer, the cache control circuitry is configured to determine whether another decrement request in the decrement request buffer can be merged with the further decrement request. When the cache control circuitry determines that another decrement request in the decrement request buffer can be merged with the further decrement request, the cache control circuitry is configured to merge the other decrement request with the further decrement request. This allows a new decrement request to be merged with one already stored in the decrement request buffer, which can provide further opportunities for merging compared to the previous example, enabling more efficient utilisation of the buffer space.

In some examples, each entry in the cache comprises an indication of the partition identifier identified by the request that caused the entry to be allocated to the cache.

For example, each entry may comprise a tag portion indicative of the address in memory associated with that entry. The tag may also include an indication of the partition identifier. Alternatively, the partition identifier may instead be indicated in a different part of the entry.

In some examples, responsive to the request identifying a given partition identifier, the cache control circuitry is configured to determine whether a hit or a miss occurs independently of the given partition identifier.

Therefore, if the partition identifier is indicated in the tag portion of a cache entry, the part of the tag excluding the partition identifier is considered when determining whether a hit or a miss occurs. It should be noted that a request specifying a particular partition identifier may therefore hit against an entry associated with a different partition identifier.

In some examples, the storage circuitry comprises static random access memory (SRAM). This may be a particularly power efficient and cost effective implementation of the present technique, more efficient than implementing the counters in individual registers, which requires a large circuit area.

The present technique, in which increment requests to the at least one counter are prioritised over decrement requests, helps to make it practical to implement the counters in SRAM. While registers are accessible individually, allowing an arbitrary number of registers to be accessed in each processing cycle, SRAM typically has a limited number of read/write ports for the whole memory structure, placing a much greater restriction on bandwidth. Therefore, the prioritisation of increment requests over decrement requests as described above is particularly useful for implementations using SRAM to store the counters, since it avoids the bandwidth limitation causing underestimates of cache occupancy for a given partition identifier, and hence allows the cache partitioning control restrictions to be respected without needing more area-intensive storage (such as registers) for the counters.

Particular embodiments will now be described with reference to the figures.

FIG. 1 schematically illustrates an example of a data processing system 2 comprising N processing clusters 4 (N is 1 or more), where each processing cluster includes one or more processing units 6 such as a CPU (central processing unit) or GPU (graphics processing unit). Each processing unit 6 may have at least one cache, e.g. a level 1 data cache 8, level 1 instruction cache 10 and shared level 2 cache 12. It will be appreciated that this is just one example of a possible cache hierarchy and other cache arrangements could be used. The processing units 6 within the same cluster are coupled by a cluster interconnect 14. The cluster interconnect may have a cluster cache 16 for caching data accessible to any of the processing units.

A system on chip (SoC) interconnect 18 couples the N clusters and any other master devices 22 (such as display controllers or direct memory access (DMA) controllers). The SoC interconnect may have a system cache 20 for caching data accessible to any of the masters connected to it. The SoC interconnect 18 controls coherency between the respective caches 8, 10, 12, 16, 20 according to any known coherency protocol. The SoC interconnect is also coupled to one or more memory controllers 24, each for controlling access to a corresponding memory 25, such as DRAM or SRAM. The SoC interconnect 18 may also direct transactions to other slave devices, such as a crypto unit for providing encryption/decryption functionality.

Hence, the data processing system 2 comprises a memory system for storing data and providing access to the data in response to transactions issued by the processing units 6 and other master devices 22. The caches 8, 10, 12, 16, 20, the interconnects 14, 18, memory controllers 24 and memory devices 25 can each be regarded as a component of the memory system. Other examples of memory system components may include memory management units or translation lookaside buffers (either within the processing units 6 themselves or further down within the system interconnect 18 or another part of the memory system), which are used for translating memory addresses used to access memory, and so can also be regarded as part of the memory system. In general, a memory system component may comprise any component of a data processing system used for servicing memory transactions for accessing memory data or controlling the processing of those memory transactions.

The memory system may have various resources available for handling memory transactions. For example, the caches 8, 10, 12, 16, 20 have storage capacity available for caching data required by a given software execution environment executing on one of the processors 6, to provide quicker access to data or instructions than if they had to be fetched from main memory 25. Similarly, MMUs/TLBs may have capacity available for caching address translation data. Also, the interconnects 14, 18, the memory controller 24 and the memory devices 25 may each have a certain amount of bandwidth available for handling memory transactions.

When multiple software execution environments executing on the processing elements 6 share access to the memory system, it can be desirable to prevent one software execution environment using more than its fair share of resource, to prevent other execution environments perceiving a loss of performance. For example, it can be desirable to prevent one software execution environment from using too much space within a shared cache. This can be particularly important for data centre (server) applications where there is an increasing demand to reduce capital expenditure by increasing the number of independent software processes which interact with a given amount of memory capacity, to increase utilisation of the data centre servers. Nevertheless, there will still be a demand to meet web application tail latency objectives and so it is undesirable if one process running on the server can monopolise memory system resources to an extent that other processes suffer. Similarly, for networking applications, it is increasingly common to combine multiple functions onto a single SoC which previously would have been on separate SoCs. This again leads to a desire to limit performance interactions between software execution environments, and to monitor how those need to allow those independent processes to access the shared memory while limiting performance interactions.

Figure 2:
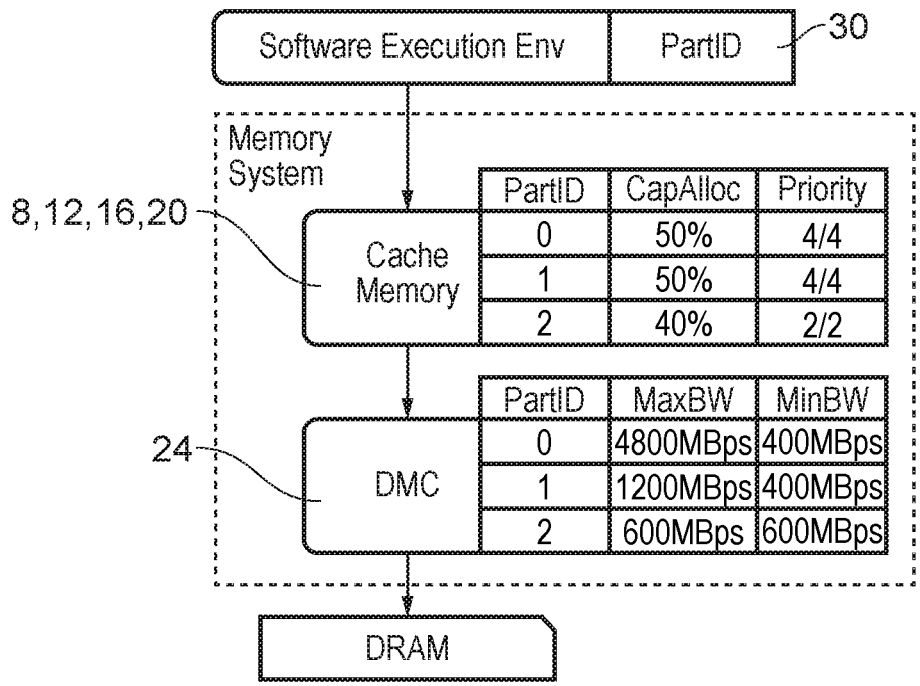
FIG. 2 schematically illustrates an example of partitioning control of memory system resources in dependence on a partition identifier allocated to a software execution environment associated with a memory transaction.

FIG. 2 schematically illustrates an example of partitioning the control of allocation of memory system resources in dependence on the software execution environment which issues the corresponding memory transactions. In this context, a software execution environment may be any process, or part of a process, executed by a processing unit within a data processing system. For example, a software execution environment may comprise an application, a guest operating system or virtual machine, a host operating system or hypervisor, a security monitor program for managing different security states of the system, or a sub-portion of any of these types of processes (e.g. a single virtual machine may have different parts considered as separate software execution environments). As shown in FIG. 2, each software execution environment may be allocated a given partition identifier 30 which is passed to the memory system components along with memory transactions that are associated with that software execution environment.

Within the memory system component, resource allocation or contention resolution operations can be controlled based on one of a number of sets of memory system component parameters selected based on the partition identifier. For example, as shown in FIG. 2, each software execution environment may be assigned a maximum occupancy value, representing a maximum amount of cache capacity that can be allocated for data/instructions associated with that software execution environment, with the relevant maximum occupancy value when servicing a given transaction being selected based on the partition identifier associated with the transaction. For example, in FIG. 2 transactions associated with partition identifier 0 may allocate data to up to 50% of the cache's storage capacity, leaving at least 50% of the cache available for other purposes. While the maximum occupancy value is represented in FIG. 2 as a percentage, it should be noted that the maximum occupancy may instead by represented as a maximum number of entries that can be allocated for the associated partition identifier.

When allocating data to the cache in response to a request specifying a given partition identifier, the current occupancy of the cache for that partition identifier (e.g. the number of entries associated with that identifier) can be compared with the maximum occupancy value associated with that partition identifier to determine whether the maximum occupancy for that partition identifier has been reached. If the maximum occupancy has been replaced, the request may be rejected, or another entry in the cache specifying that partition identifier may be evicted from the cache to allow the new entry to be allocated.

Similarly, in a memory system component such as the memory controller 24 which has a finite amount of bandwidth available for servicing memory transactions, minimum and/or maximum bandwidth thresholds may be specified for each partition identifier. A memory transaction associated with a given partition identifier can be prioritised if, within a given period of time, memory transactions specifying that partition identifier have used less than the minimum amount of bandwidth, while a reduced priority can be used for a memory transaction if the maximum bandwidth has already been used or exceeded for transactions specifying the same partition identifier.

It will be appreciated that these are just two examples of ways in which control of memory system resources can be partitioned based on the software execution environment that issued the corresponding transactions. In general, by allowing different processes to "see" different partitioned portions of the resources provided by the memory system, this allows performance interactions between the processes to be limited to help address the problems discussed above.

Figure 3:
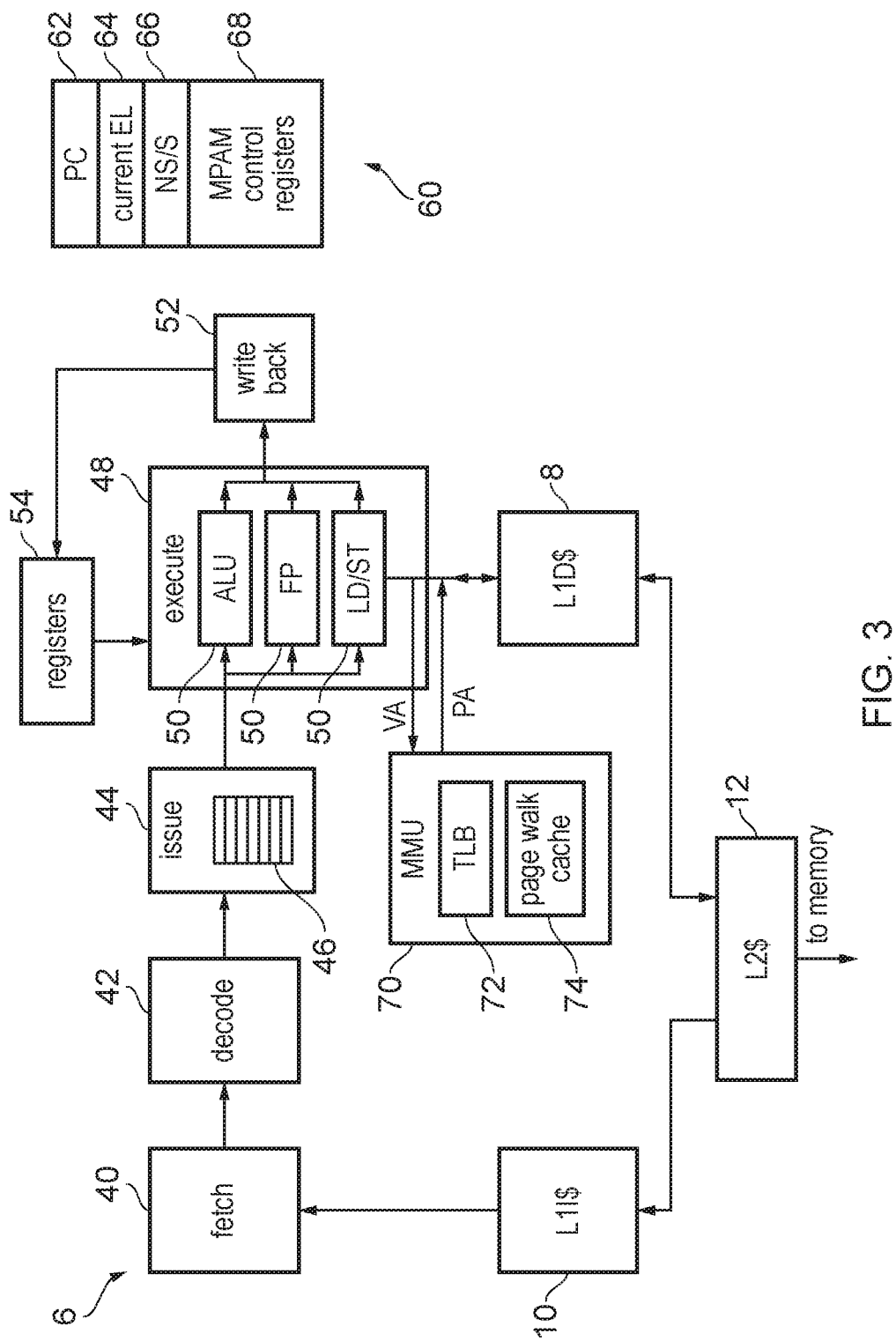
FIG. 3 schematically illustrates an example of processing circuitry for issuing memory transactions specifying a partition identifier.

FIG. 3 schematically illustrates an example of the processing unit 6 in more detail. The processor includes a processing pipeline including a number of pipeline stages, including a fetch stage 40 for fetching instructions from the instruction cache 10, a decode stage 42 for decoding the fetched instructions, an issue stage 44 comprising an issue queue 46 for queueing instructions while waiting for their operands to become available and issuing the instructions for execution when the operands are available, an execute stage 48 comprising a number of execute units 50 for executing different classes of instructions to perform corresponding processing operations, and a write back stage 52 for writing results of the processing operations to data registers 54. Source operands for the data processing operations may be read from the registers 54 by the execution stage 48. In this example, the execute stage 48 includes an ALU (arithmetic/logic unit) for performing arithmetic or logical operations, a floating point (FP) unit for performing operations using floating-point values and a load/store unit for performing load operations to load data from the memory system into registers 54 or store operations to store data from registers 54 to the memory system. It will be appreciated that these are just some examples of possible execution units and other types could be provided. Similarly, other examples may have different configurations of pipeline stages. For example, in an out-of-order processor, an additional register renaming stage may be provided for remapping architectural register specifiers specified by instructions to physical register specifiers identifying registers 54 provided in hardware, as well as a reorder buffer for tracking the execution and commitment of instructions executed in a different order to the order in which they were fetched from the cache 10. Similarly, other mechanisms not shown in FIG. 1 could still be provided, e.g. branch prediction functionality.

The processor 6 in this example has a number of control registers 60, including for example a program counter register 62 for storing a program counter indicating a current point of execution of the program being executed, an exception level register 64 for storing an indication of a current exception level at which the processor is executing instructions, a security state register 66 for storing an indication of whether the processor is in a non-secure or a secure state, and memory partitioning and monitoring (MPAM) control registers 68 for controlling memory system resource and performance monitoring partitioning. It will be appreciated that other control registers could also be provided.

The processor has a memory management unit (MMU) 70 for controlling access to the memory system in response to memory transactions. For example, when encountering a load or store instruction, the load/store unit issues a corresponding memory transaction specifying a virtual address. The virtual address is provided to the memory management unit (MMU) 70 which translates the virtual address into a physical address using address mapping data stored in a translation lookaside buffer (TLB) 72. Each TLB entry may identify not only the mapping data identifying how to translate the address, but also associated access permission data which defines whether the processor is allowed to read or write to addresses in the corresponding page of the address space. In some examples there may be multiple stages of address translation and so there may be multiple TLBs, for example a stage 1 TLB providing a first stage of translation for mapping the virtual address generated by the load/store unit 50 to an intermediate physical address, and a stage 2 TLB providing a second stage of translation for mapping the intermediate physical address to a physical address used by the memory system to identify the data to be accessed. The mapping data for the stage 1 TLB may be set under control of an operating system, while the mapping data for the stage 2 TLB may be set under control of a hypervisor, for example, to support virtualisation. While FIG. 3 for conciseness shows the MMU being accessed in response to data accesses being triggered by the load/store unit, the MMU may also be accessed when the fetch stage 40 requires fetching of an instruction which is not already stored in the instruction cache 10, or if the instruction cache 10 initiates an instruction prefetch operation to prefetch an instruction into the cache before it is actually required by the fetch stage 40. Hence, virtual addresses of instructions to be executed may similarly be translated into physical addresses using the MMU 70.

In addition to the TLB 72, the MMU may also comprise other types of cache, such as a page walk cache 74 for caching data used for identifying mapping data to be loaded into the TLB during a page table walk. The memory system may store page tables specifying address mapping data for each page of a virtual memory address space. The TLB 72 may cache a subset of those page table entries for a number of recently accessed pages. If the processor issues a memory transaction to a page which does not have corresponding address mapping data stored in the TLB 72, then a page table walk is initiated. This can be relatively slow because there may be multiple levels of page tables to traverse in memory to identify the address mapping entry for the required page. To speed up page table walks, recently accessed page table entries of the page table can be placed in the page walk cache 74. These would typically be page table entries other than the final level page table entry which actually specifies the mapping for the required page. These higher level page table entries would typically specify where other page table entries for corresponding ranges of addresses can be found in memory. By caching at least some levels of the page table traversed in a previous page table walk in the page walk cache 74, page table walks for other addresses sharing the same initial part of the page table walk can be made faster. Alternatively, rather than caching the page table entries themselves, the page walk cache 74 could cache the addresses at which those page table entries can be found in the memory, so that again a given page table entry can be accessed faster than if those addresses had to be identified by first accessing other page table entries in the memory.

Figure 4:
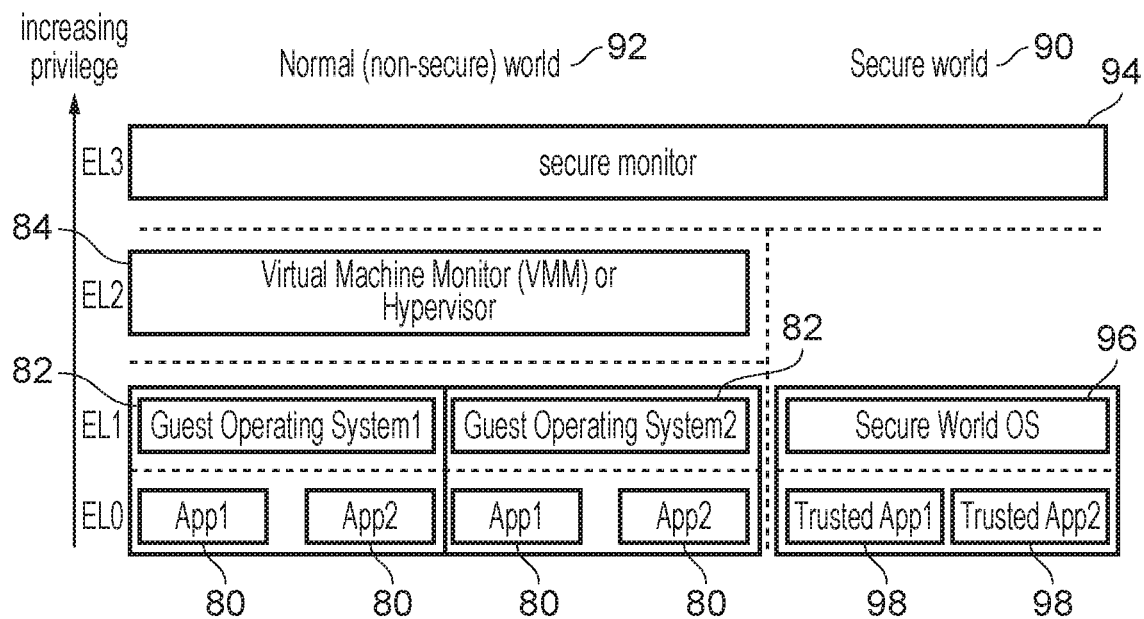
FIG. 4 shows an example of different software execution environments executed by the processing circuitry.

FIG. 4 shows an example of different software execution environments which may be executed by the processor 6. In this example the architecture supports four different exception levels EL0 to EL3 increasing in privilege level (so that EL3 has the highest privilege exception level and EL0 has the lowest privilege exception level). In general, a higher privilege level has greater privilege than a lower privilege level and so can access at least some data and/or carry out some processing operations which are not available to a lower privilege level. Applications 80 are executed at the lowest privilege level EL0. A number of guest operating systems 82 are executed at privilege level EL1 with each guest operating system 82 managing one or more of the applications 80 at EL0. A virtual machine monitor, also known as a hypervisor or a host operating system, 84 is executed at exception level EL2 and manages the virtualisation of the respective guest operating systems 82. Transitions from a lower exception level to a higher exception level may be caused by exception events (e.g. events required to be handled by the hypervisor may cause a transition to EL2), while transitions back to a lower level may be caused by return from handling an exception event. Some types of exception events may be serviced at the same exception level as the level they are taken from, while others may trigger a transition to a higher exception state. The current exception level register 64 indicates which of the exception levels EL0 to EL3 the processing circuitry 6 is currently executing code in.

In this example the system also supports partitioning between a secure domain 90 and a normal (less secure) domain 92. Sensitive data or instructions can be protected by allocating them to memory addresses marked as accessible to the secure domain 90 only, with the processor having hardware mechanisms for ensuring that processes executing in the less secure domain 92 cannot access the data or instructions. For example, the access permissions set in the MMU 70 may control the partitioning between the secure and non secure domains, or alternatively a completely separate security memory management unit may be used to control the security state partitioning, with separate secure and non secure MMUs 70 being provided for sub-control within the respective security states. Transitions between the secure and normal domains 90, 92 may be managed by a secure monitor process 94 executing at the highest privilege level EL3. This allows transitions between domains to be tightly controlled to prevent non-secure operations 80 or operating systems 82 for example accessing data from the secure domain. In other examples, hardware techniques may be used to enforce separation between the security states and police transitions, so that it is possible for code in the normal domain 92 to branch directly to code in the secure domain 90 without transitioning via a separate secure monitor process 94. However, for ease of explanation, the subsequent description below will refer to an example which does use the secure monitor process 94 at EL3. Within the secure domain 90, a secure world operating system 96 executes at exception level EL1 and one or more trusted applications 98 may execute under control of that operating system 96 at exception level EL0. In this example there is no exception level EL2 in the secure domain 90 because virtualisation is not supported in the secure domain, although it would still be possible to provide this if desired. An example of an architecture for supporting such a secure domain 90 may be the TrustZone® architecture provided by ARM® Limited of Cambridge, UK. Nevertheless it will be appreciated that other techniques could also be used. Some examples could have more than two security states, providing three or more states with different levels of security associated with them. The security state register 66 indicates whether the current domain is the secure domain 90 or the non-secure 92 and this indicates to the MMU 70 or other control units what access permissions to use to govern whether certain data can be accessed or operations are allowed.

Figure 5:
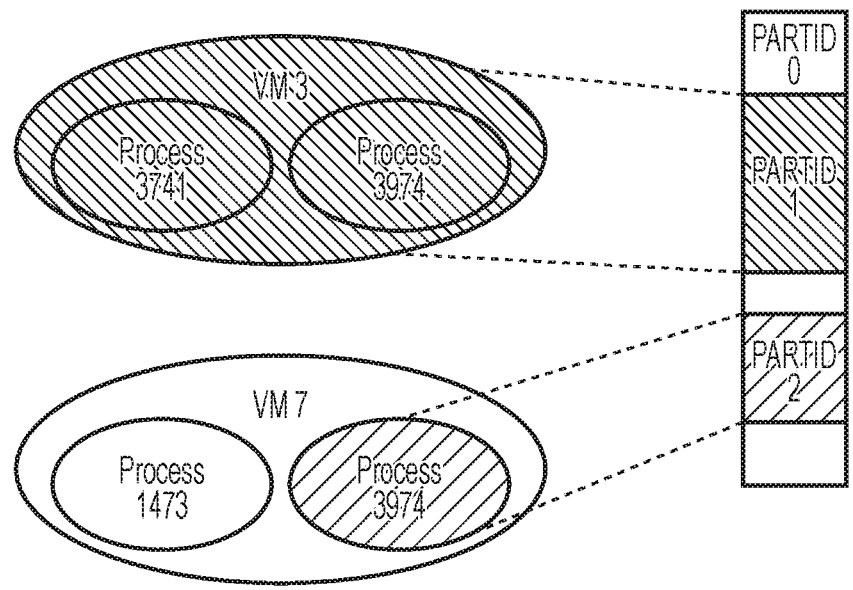
FIG. 5 illustrates an example of allocating partition identifiers to different software execution environments.

Hence, FIG. 4 shows a number of different software execution environments 80, 82, 84, 94, 96, 98 which can be executed on the system. Each of these software execution environments can be allocated a given partition identifier (partition ID or PARTID), or a group of two or more software execution environments may be allocated a common partition ID. In some cases, individual parts of a single processes (e.g. different functions or sub-routines) can be regarded as separate execution environments and allocated separate partition IDs. For example, FIG. 5 shows an example where virtual machine VM 3 and the two applications 3741, 3974 executing under it are all allocated PARTID 1, a particular process 3974 executing under a second virtual machine, VM 7, is allocated PARTID 2, and the VM7 itself and another process 1473 running under it is allocated PARTID 0. It is not necessary to allocate a bespoke partition ID to every software execution environment. A default partition ID may be specified to be used for software execution environments for which no dedicate partition ID has been allocated. The control of which parts of the partition ID space are allocated to each software execution environment is carried out by software at a higher privilege level, for example a hypervisor running at EL2 controls the allocation of partitions to virtual machine operating systems running at EL1. However, in some cases the hypervisor may permit an operating system at a lower privilege level to set its own partition IDs for parts of its own code or for the applications running under it. Also, in some examples the secure world 90 may have a completely separate partition ID space from the normal world 92, controlled by the secure world OS or monitor program EL3.

As discussed above with reference to FIG. 3, the partitioning of memory resources may be controlled by a set of MPAM control registers 68 (also known as MPAM system registers). The MPAM control registers 68 include a number of partition identifier registers each corresponding to a respective operating state of the processing circuitry and specifying information for determining which partition identifier is to be used for memory access requests issued when operating at a given operating state or privilege level. By defining different registers for respective operating states (e.g. respective exception levels), this avoids needing to update the partition identifier registers each time an exception occurs triggering a switch between operating states. On the other hand, when switching between different processes executed at the same state (e.g. different applications at EL0 or different guest operating systems at EL1), an exception event triggers a switch to a higher exception state where the process running at that state (e.g. the operating system at EL1 or the hypervisor at EL2) then updates the partition identifiers in the relevant partition identifier register for the new process to be executed in the lower exception state, before returning processing to the lower exception state to allow the new process to continue.

It can be useful to allow separate partition identifiers to be defined for the data and instruction accesses for the same software execution environment, so that different resource control parameters can be used for the corresponding instruction and data accesses. For example, it may often be desirable to have more data partitions than instruction partitions, because it can be relatively common for multiple software execution environments to use the same code but execute with different data inputs. Therefore, it can be particularly useful to be able to share a single instruction partition identifier among multiple software execution environments while allowing each of those environments to use different data partitions. By providing separate instruction and data partition fields in the partition identifier register, where the instruction and data partition identifiers are selected from a common identifier space, it is possible to reuse the same partition identifier between different software execution environments and to partition the partition identifier space between data and instructions as required without constraining this to a fifty-fifty split. Even though some additional storage capacity may be required for two partition identifier fields in each partition identifier register, this approach can save resource at the memory system component since by sharing one partition between the instruction accesses of multiple execution environments, fewer sets of control parameters (and hence less storage) are required at the memory system component.

More detail on the MPAM control registers 68 and how they are used to generate the partition identifier to be appended to a given memory access request can be found in U.S. Pat. No. 10,394,454, the contents of which is entirely incorporated herein by reference.

The partition identifiers, allocated according to the MPAM control registers 68, can then be used to control allocation of memory resources. For example, considering the case of cache partitioning in particular, each partition identifier may be assigned a maximum occupancy value, indicative of the maximum number of entries in the cache that can be allocated for that partition identifier. The current occupancy of the cache for each partition identifier (e.g., the number of entries in the cache currently allocated for each partition identifier) may be tracked, so that the current occupancy can be compared with the maximum occupancy before any further entries are allocated to the cache for the given partition identifier. The maximum occupancy value and current occupancy value for each partition identifier may be stored in memory, or in registers or static random access memory (SRAM) within the cache circuitry.

For example, a current occupancy register and a maximum occupancy register may be provided in the cache for each partition. This approach makes the management of accesses to the cache relatively simple to implement, as each register can be controlled independently, and so any register can be updated in any processing cycle. However, in a typical system there may be a large number of partitions defined—for example, there may be up to 512 partitions defined in a given system. Implementing a separate current occupancy register and maximum occupancy register for each partition identifier in a typical system therefore requires a very large number of registers—for example, a system in which 512 partition identifiers are defined may require as many as 1024 separate physical registers to be maintained. Providing such a large number of registers incurs a significant cost in terms of circuit area, and may reduce the efficiency of power dissipation in the system. This may, therefore, reduce the overall efficiency of the system.

Figure 6:
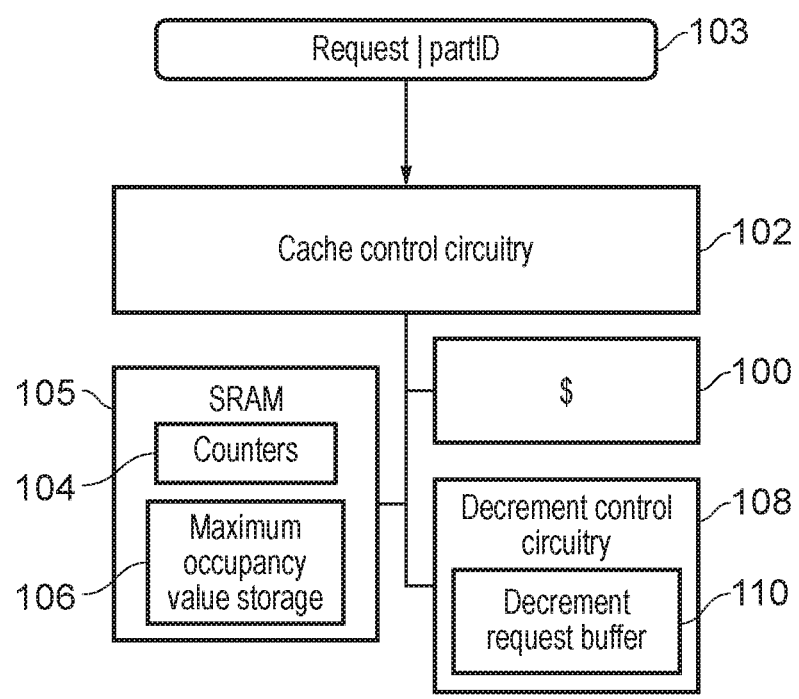
FIG. 6 schematically illustrates an apparatus for controlling cache allocation in dependence on a partition identifier.

Alternatively, the current occupancy and maximum occupancy for each partition identifier may be stored in an SRAM unit within the cache. FIG. 6 depicts a system in which an SRAM unit in the cache is used to track the current occupancy and maximum occupancy for each partition identifier.

In FIG. 6, a cache 100 is provided, under the control of cache control circuitry 102. The cache comprises multiple entries, each identifying a partition identifier associated with a request that caused allocation of that entry to the cache. The cache control circuitry 102 controls accesses to the cache 100 in response to requests made from the processing pipeline 6, such as read requests, write requests and invalidate requests. For example, a request 103 specifying a given partition identifier may be received by the cache control circuitry 102. The request specifies an address in memory and may be a request to read information from that address in memory or write information to that address. The cache control circuitry 102 may also receive requests to invalidate one or more existing entries in the cache (invalidate request). In response to the request 103, the cache control circuitry is configured to perform a lookup in the cache 100. The lookup involves selecting a set of entries to lookup based on an index value derived from the target address of the request, and comparing a tag of the address specified in the request 103 with the tags of the selected set of entries stored in the cache, to determine whether a hit or a miss occurs. If the request is a read request and a hit is returned, the data stored in the identified entry is returned to the processor which made the request, without needing to retrieve the data from memory. If, however, the request is a read request but does not hit in the cache 100, the data may need to be retrieved from memory (not shown). This may result in a new entry being allocated to the cache 100. Similarly, if the request 103 is a write request which misses in the cache, this also may cause a new entry to be allocated in the cache 100. An invalidate request, on the other hand, triggers the removal (or invalidation) of one or more entries from the cache 100, if those entries satisfy any invalidation criteria specified by the invalidate request.

The partition identifier associated with each entry in the cache may be stored as part of that entry's tag; however, the partition identifier is not used in determining whether a hit or a miss occurs when searching the cache. Therefore, a request specifying one partition identifier may hit against a cache entry associated with a different partition identifier.

The apparatus of FIG. 6 also includes a static random access memory (SRAM) unit 105. the SRAM 105 stores a set of counters 104 for tracking the current occupancy in the cache 100 for each partition identifier. For example, there may be a counter in the SRAM 105 for each partition identifier, and this counter may be incremented in response to an entry in the cache 100 being allocated for that partition identifier, and decremented in response to an entry for that partition identifier being evicted or replaced. The counter for each partition identifier therefore tracks the number of entries in the cache associated with that partition identifier.

Also stored in the SRAM 105 is a set of maximum occupancy values 106, indicative of the maximum number of entries that can be allocated for each partition identifier. For example, a maximum occupancy value may be stored for each partition identifier. It should be noted that, although the maximum occupancy values 106 are shown in FIG. 6 as being stored in part of the SRAM 105, the maximum occupancy value storage 106 could, instead, be a separate storage structure.

Storing the counters 104 in SRAM 105 requires less circuit area than providing separate maximum occupancy registers for each partition identifier. This lowers the cost associated with implementing cache partitioning, and also improves the efficiency of the overall system by improving the power dissipation within the cache circuitry.

As will be discussed in more detail below, when an entry is to be allocated to the cache 100 for a particular partition identifier, the value of the counter associated with that partition identifier is compared with the associated maximum occupancy value. If the maximum occupancy value for the particular partition identifier has been reached, another entry in the cache associated with that partition identifier may need to be evicted or replaced in order to avoid exceeding the associated maximum occupancy. Upon allocating the entry to the cache 100, the control circuitry 102 is then configured to increment the counter associated with the particular partition identifier.

When an entry associated with a given partition identifier is evicted or replaced in the cache 100, the cache control circuitry 102 may not immediately decrement the associated counter. Instead decrement control circuitry 108 is provided which receives a decrement request from the cache control circuitry 102 and stores it in a decrement request buffer 110. The decrement request buffer 110 may, for example, be a first-in-first-out (FIFO) buffer, in which case the decrement request will be added to the tail of the FIFO. The cache control circuitry 102 prioritises pending increment requests to any of the counters stored in the SRAM over the decrement requests stored in the decrement request buffer 110, for example by waiting until a processing cycle in which no increment requests are executed (e.g. a cycle in which no allocations to the cache are made) to process the next decrement request in the decrement request buffer 110. It should be noted that increment requests to any of the stored counters are prioritised over decrement requests to any of the stored counters, even if the decrement request is to another one of the stored counters, rather than merely prioritising increment requests to a given counter over decrement requests to that same counter.

In some cases, a request to decrement one of the counters may not need to be stored in the decrement request buffer. For example, if the request can be serviced immediately (e.g. if there are no pending increment requests) the request may bypass the FIFO and the cache control circuitry may decrement the associated counter straight away.

As can be seen from the examples described so far, the partitioning of cache resources provides maximum limits on cache occupancy for a given partition identifier, but may not guarantee any minimum limit on cache occupancy for that partition identifier. As a result, the tracking of the current occupancy per partition identifier does not necessarily need to be accurate, as long as any inaccuracy is conservative. In other words, the incrementation of the counters should be accurate, whereas the decrementation need not necessarily be accurate. Therefore, it is appropriate to prioritise increment requests to increment the counters over decrement requests to decrement the counters. Decrement requests can therefore be withheld or delayed to allow pending increment requests to be executed. For example, decrement requests may be postponed until a cycle in which no increment is taking place—for example, the decrement requests may be delayed until a cycle in which a read-only request is executed. This may prevent updates to the cache from being stalled, since increment requests are not delayed to allow decrement request to be carried out.

Figure 7:
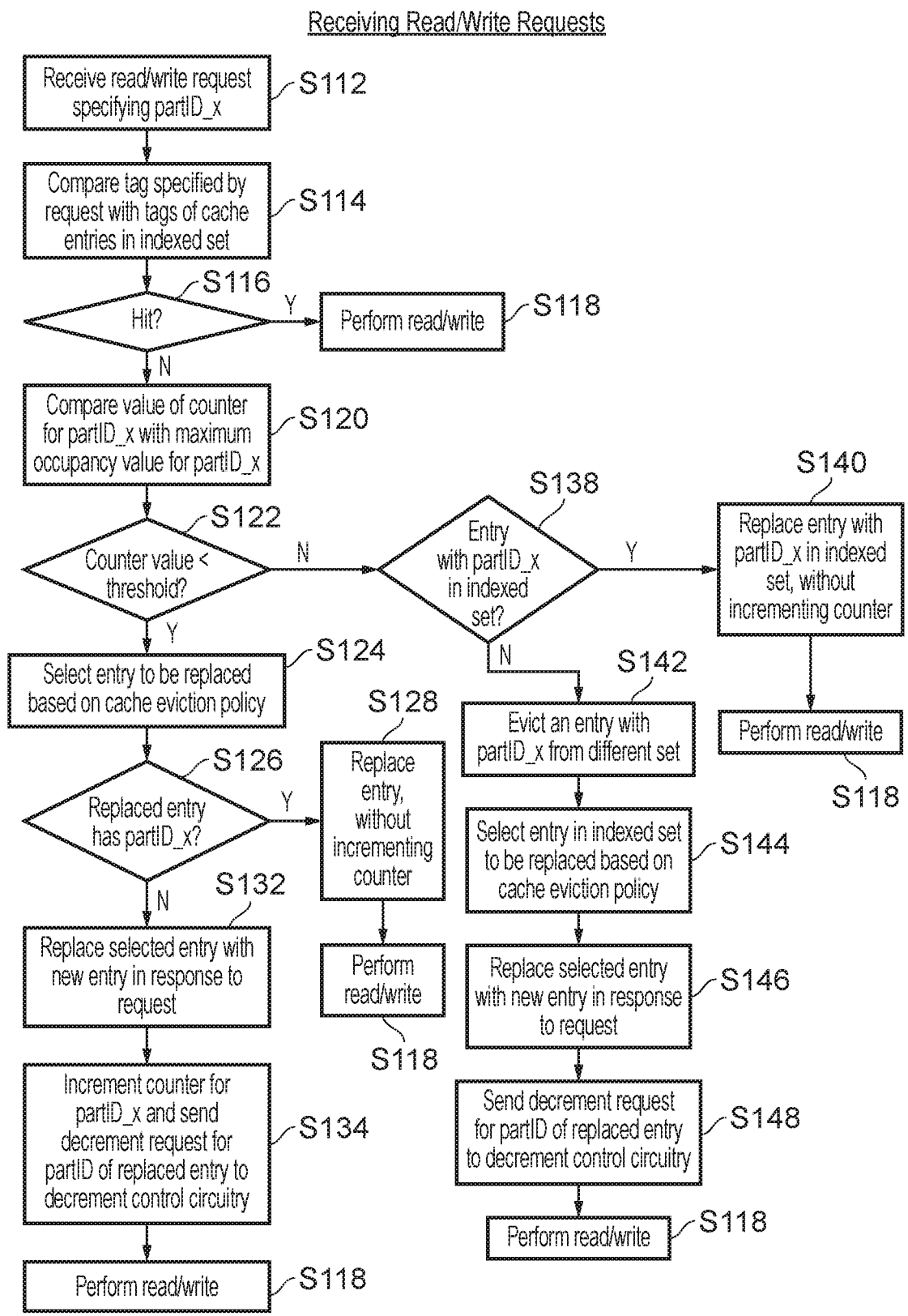
FIG. 7 is a flow diagram illustrating a method for processing read or write requests to a cache.

FIG. 7 is a flow diagram illustrating the response of the cache control circuitry 102 to requests to read or write information to the cache 100. In a step S112, a read or write request specifying a given partition identifier, referred to as partID_x, is received by the cache control circuitry 102. In a step S114, the tag specified by the request is compared with tags of cache entries in a particular indexed set. This allows it to be determined, S116, whether a hit or a miss occurs. If a hit occurs, a step S118 occurs of performing the relevant read or write on the cache entry for which the hit was detected. In this case there is no need to increment or decrement any of the counters 104.

On the other hand, if a miss occurs, a step S120 of comparing the value of the counter of the given partition identifier with a maximum occupancy value for that partition identifier is performed, in order to determine, S122, whether the value of the counter is less than a threshold value (e.g. the maximum occupancy value for partID_x). If the counter value is less than the threshold, the maximum occupancy value has not been reached, and a step S124 of selecting an entry to be replaced based on a cache eviction policy can be carried out. Once the entry has been selected, a step S126 of determining whether the selected entry has the same partition identifier, partID_x, is performed. If the replaced entry does have the same partition identifier, a step S128 of replacing the entry without incrementing the associated counter is carried out. Then a step S118 of performing the associated read or write can be performed. On the other hand, if at step S126 it is determined that the replaced entry does not have the same partition identifier, a step S132 of replacing the selected entry with a new entry in response to the request is carried out. This is then followed by step S134 of incrementing the counter for a partID_x and sending a decrement request to the decrement control circuitry 108 for the counter associated with the partition identifier of the replaced entry. Then, a step S118 of performing the read or write is carried out.

Returning now to step S122, if it was determined at this step that the counter value was greater than or equal to the threshold value, a step S138 of determining whether an entry with partID_x is present in the indexed set is performed. If there is an entry with partID_x in the indexed set, a step S140 of replacing that entry with the required data is performed, without implementing the counter associated with partID_x. This is followed by a step S118 of performing a read or write.

On the other hand, if no entry with the partition identifier partID_x is present in the indexed set, a step S142 of evicting an entry with partID_x from a different set is carried out. Any eviction policy may be used to select which particular entry associated with partID_x is the victim entry (note this may be a selection between entries in multiple sets, in contrast to the eviction policy described at steps S124, S144 which selects between entries in the same set). In a step S144, an entry in the indexed set is selected to be replaced based on the cache eviction policy for selecting between entries in the same set. The selected entry is replaced, S146, with a new entry for partID_x in response to the request. In a step S148, a decrement request for the partition identifier of the replaced entry is sent to the decrement control circuitry 108. Finally, the read or write is performed in a step S118. Note that in this scenario there is no need to increment or decrement the counter associated with partID_x because the new entry for partID_x has caused another entry for the same partition identifier to be evicted, and so the total number of entries associated with partID_x remains the same.

In accordance with the above method, a read or write request can be executed without allocating too may cache entries to a particular partition identifier.

Figure 8:
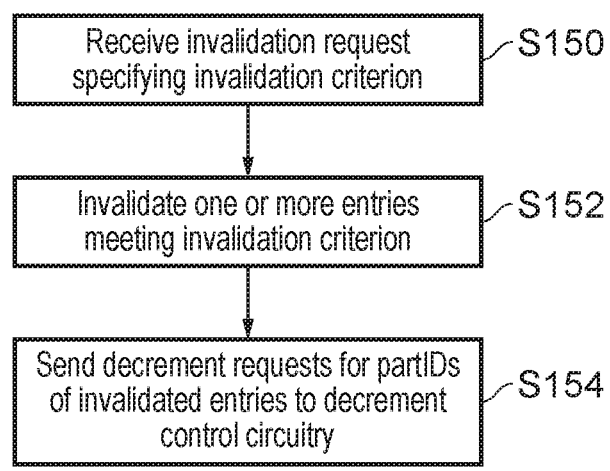
FIG. 8 is a flow diagram illustrating a method for processing an invalidation request to a cache.

FIG. 8 is a flow diagram illustrating a method of responding to an invalidation request received by the cache control circuitry 102. In a step S150, an invalidation request specifying a particular invalidation criterion (or multiple criteria) is received by the cache control circuitry 102. The invalidation criterion could be based on specifying a specific address to be invalidated or a range of addresses to be invalidated. Also, invalidation criteria could be defined based on invalidating entries associated with a particular execution context or partition identifier. Also, for some invalidation requests, the request may be to invalidate all entries of the cache. One or more entries meeting the invalidation criterion are then invalidated in a step 152, and decrement requests for partition identifiers of the invalidated entries are sent, S154, to the decrement control circuitry 108.

Figure 9:
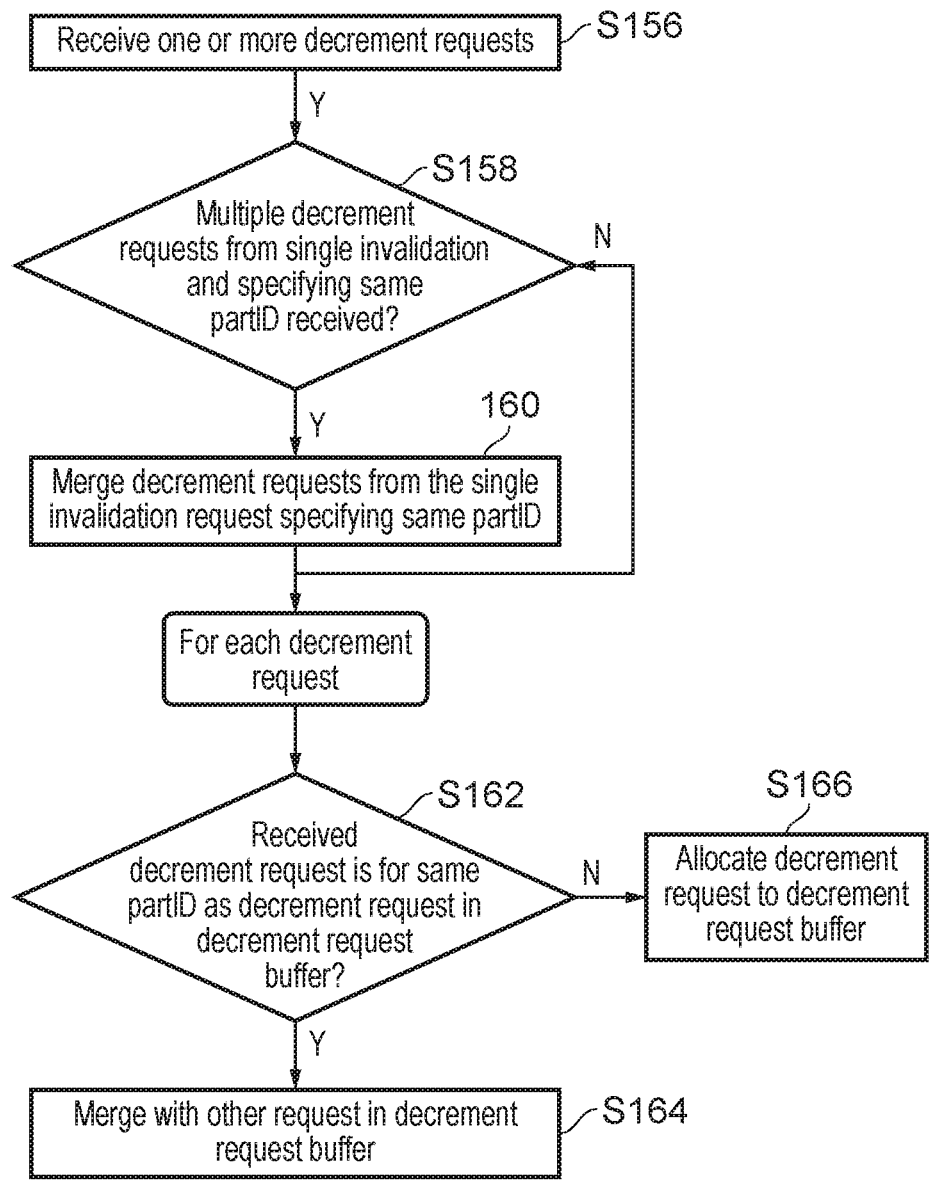
FIG. 9 is a flow diagram illustrating a method for allocating decrement requests to a decrement request buffer.

FIG. 9 is a flow diagram illustrating the response of the decrement control circuitry 108 to decrement requests. In a step S156, one or more decrement requests are received by the decrement control circuitry 108. The decrement control circuitry determines, S158, whether multiple decrement requests from a single invalidation have been received that specify the same partition identifier. If this is the case, a step S160 of merging the decrement requests from the single invalidation request specifying the same partition identifier is carried out. On the other hand, if at step S158 it is determined that multiple decrement requests from a single invalidation specify the same partition identifier have not been received, step S160 is skipped. In a step S162, it is determined whether a received decrement request is for the same partition identifier as another decrement request already in the decrement request buffer 110. If so, that request is merged with the request in the decrement request buffer 110, step S164. On the other hand, if not, the entry is merely allocated to the decrement request buffer 110, S166.

FIG. 9 describes two types of merging decrement requests: merging decrement request from a single invalidation request specifying the same partition identifier (S160) and merging a given decrement request with another request already stored in the decrement request buffer (S164). In some implementations, rather than being configured to perform both types of merging, the decrement control circuitry may only be configured to utilise one of these types of merging (e.g. performing steps S158 and S160 but not steps S162 and S166, or vice versa). In other implementations, there may be no merging of decrement requests at all, and steps S158, S160, S162 and S166 may be omitted.

Figure 10:
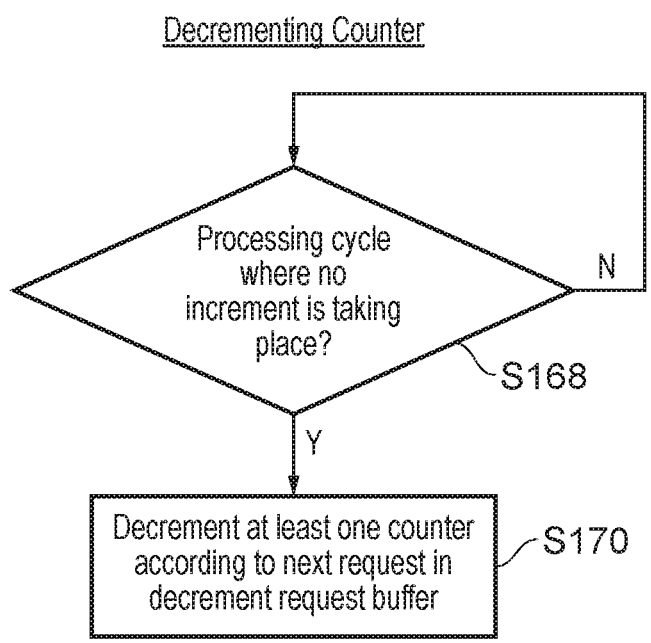
FIG. 10 is a flow diagram illustrating a method for processing a decrement request for at least one counter associated with a cache.

FIG. 10 is a flow diagram illustrating the decrementation of at least one counter. In a step S168, it is determined whether the current processing cycle is one in which no increment is taking place. If so, the at least one counter is decremented, S170, in response to the next request in the decrement request queue. If the current processing cycle is not one in which no increment request is taking place, the decrement control circuitry 208 does not decrement the at least one counter.

Figure 11:
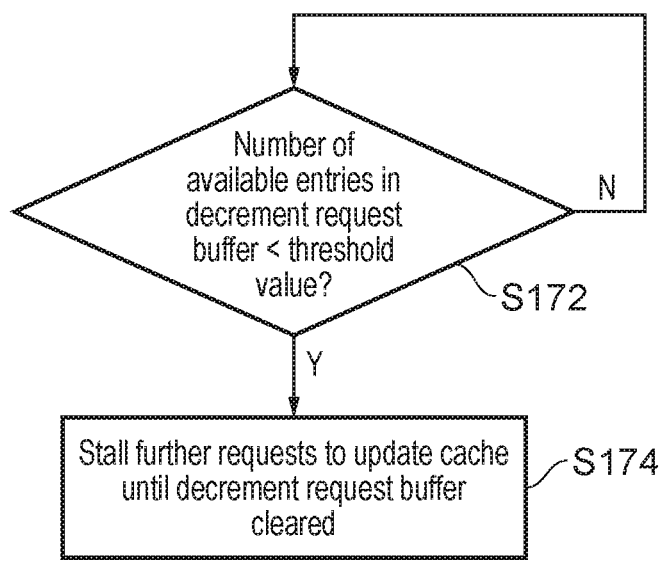
FIG. 11 is a flow diagram illustrating clearing a decrement request buffer.

FIG. 11 is a flow diagram illustrating the clearing of the decrement request buffer. In a step S172, it is determined whether the number of available entries in the decrement request buffer has fallen below a particular threshold value. If not, this step repeats, but if so, a step S174 of stalling further requests to update the cache until the decrement request buffer is cleared is carried out.

In accordance with the examples described above, at least one counter is provided for tracking the current occupancy of a cache for each of a set of partition identifiers. When an entry for a particular partition identifier is allocated to the cache, the counter associated with that partition identifier is incremented, and when an entry for a particular partition identifier is evicted or replaced, the associated counter is decremented. In the examples described above, a decrement request to decrement the at least one counter is postponed to give any pending increment requests priority. This allows decrement requests to be delayed until a processing cycle in which they can be carried out without stalling further requests to update the cache—for example, a cycle in which no increment requests are taking place. This improves the performance of the cache, while ensuring than any inaccuracy in the value of the at least one counter is conservative, such that the current occupancy for each partition identifier is over-estimated rather than under-estimated.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

I claim:

1. An apparatus comprising:
a cache comprising a plurality of entries, each entry being associated with a partition identifier;
storage circuitry configured to store at least one counter, each indicative of a number of entries in the cache associated with a respective partition identifier; and
cache control circuitry configured to allocate entries to the cache in response to requests, in which the cache control circuitry is responsive to a request identifying a given partition identifier to control allocation of an entry in dependence on the counter associated with the given partition identifier;
in which the cache control circuitry is configured to increment a counter associated with the given partition identifier in response to an entry in the cache associated with the given partition identifier being allocated, and to decrement the counter associated with the given partition identifier in response to an entry in the cache associated with the given partition identifier being evicted or replaced; and
in which when an increment request to increment one of the at least one counter is pending, the cache control circuitry is configured to prioritise the pending increment request in preference over a decrement request to decrement one of the at least one counter.

2. The apparatus of claim 1, in which:
the cache control circuitry is configured to postpone the decrement request until a processing cycle in which an increment request is absent or when a number of pending increment requests is less than a maximum number of counter update requests which can be handled in a same processing cycle.

3. The apparatus of claim 1, comprising:
maximum occupancy storage circuitry configured to store at least one maximum occupancy value, each indicative of a maximum occupancy for a respective partition identifier;
in which, responsive to the request identifying the given partition identifier, the cache control circuitry is configured to compare a value of the counter associated with the given partition identifier with the maximum occupancy value associated with the given partition identifier, and to control the allocation of said entry in dependence on the comparison.

4. The apparatus of claim 3, in which:
when the cache control circuitry determines that the value of the counter associated with the given partition identifier is less than the maximum occupancy value associated with the given partition identifier, the cache control circuitry is configured to allocate said entry in the cache for the request; and
when the cache control circuitry determines that the value of the counter associated with the given identifier is greater than or equal to the maximum occupancy for the given identifier, the cache control circuitry is configured to evict an existing entry in the cache for the given partition identifier, and replace the existing entry with said entry allocated for the request.

5. The apparatus of claim 3, in which:
the maximum occupancy value for each partition identifier is configurable by software.

6. The apparatus of claim 1, comprising:
a decrement request buffer configured to store pending decrement requests.

7. The apparatus of claim 6, in which:
the decrement request buffer is a first-in-first-out (FIFO) buffer.

8. The apparatus of claim 6, in which:
when a number of available entries in the decrement request buffer falls below a predetermined threshold number, the cache control circuitry is configured to stall further requests to update the cache for a predetermined period.

9. The apparatus of claim 8, in which the predetermined period is at least one of:
a period until the number of available entries in the decrement request buffer reaches a predetermined number; and
a predetermined number of processing cycles.

10. The apparatus of claim 6, in which:
the cache control circuitry is configured to merge two or more decrement requests.

11. The apparatus of claim 10, in which:
the cache comprises a set associative cache; and
when a plurality of entries in a given set of the cache are evicted or replaced in response to a single request, generating a plurality of decrement requests including at least two decrement requests for decrementing the counter relating to the same partition identifier, the cache control circuitry is configured to merge the at least two of decrement requests into a single decrement request.

12. The apparatus of claim 10, in which:
prior to allocating a further decrement request to the decrement request buffer, the cache control circuitry is configured to determine whether another decrement request in the decrement request buffer can be merged with the further decrement request; and
when the cache control circuitry determines that another decrement request in the decrement request buffer can be merged with the further decrement request, the cache control circuitry is configured to merge the other decrement request with the further decrement request.

13. The apparatus of claim 1, in which:
each entry in the cache comprises an indication of the partition identifier identified by the request that caused the entry to be allocated to the cache.

14. The apparatus of claim 13, in which:
responsive to the request identifying a given partition identifier, the cache control circuitry is configured to determine whether a hit or a miss occurs independently of the given partition identifier.

15. The apparatus of claim 1, in which:
the storage circuitry comprises static random access memory (SRAM).

16. A method comprising:
storing a plurality of entries in a cache, each entry being associated with a partition identifier;
storing at least one counter in storage circuitry, each counter indicative of a number of entries in the cache associated with a respective partition identifier;
responsive to a request identifying a given partition identifier, controlling allocation of an entry to the cache in dependence on the counter associated with the given partition identifier;
incrementing a counter associated with the given partition identifier in response to an entry in the cache associated with the given partition identifier being allocated, and decrementing the counter associated with the given partition identifier in response to an entry in the cache associated with the given partition identifier being evicted or replaced; and
when an increment request to increment one of the at least one counter is pending, prioritising the pending increment request in preference over a decrement request to decrement one of the at least one counter.

17. An apparatus comprising:
means for storing a plurality of entries, each entry being associated with a partition identifier;
means for storing at least one counter, each indicative of a number of entries in the cache associated with a respective partition identifier;
means for controlling, responsive to a request identifying a given partition identifier, allocation of an entry to the means for storing a plurality of entries, in dependence on the counter associated with the given partition identifier;
means for incrementing a counter associated with the given partition identifier in response to an entry associated with the given partition identifier being allocated to the means for storing a plurality of entries, and means for decrementing the counter associated with the given partition identifier in response to an entry associated with the given partition identifier being evicted or replaced in the means for storing a plurality of entries; and
in which when an increment request to increment one of the at least one counter is pending, the means for incrementing and the means for decrementing are configured to prioritise the pending increment request in preference over a decrement request to decrement one of the at least one counter.

* * * * *